(12) United States Patent
Martin et al.

(10) Patent No.: US 12,062,126 B2
(45) Date of Patent: Aug. 13, 2024

(54) LOAD MULTIPLE PRIMITIVES PER THREAD IN A GRAPHICS PIPELINE

(71) Applicant: Advanced Micro Devices, Inc., Santa Clara, CA (US)

(72) Inventors: Todd Martin, Orlando, FL (US); Tad Robert Litwiller, Orlando, FL (US); Nishank Pathak, Orlando, FL (US); Randy Wayne Ramsey, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/489,008

(22) Filed: Sep. 29, 2021

(65) Prior Publication Data

US 2023/0094115 A1 Mar. 30, 2023

(51) Int. Cl.
*G06T 15/00* (2011.01)
(52) U.S. Cl.
CPC .................................. *G06T 15/005* (2013.01)
(58) Field of Classification Search
None
See application file for complete search history.

(56) References Cited

U.S. PATENT DOCUMENTS

| | | | |
|---|---|---|---|
| 5,900,025 A | 5/1999 | Sollars | |
| 7,594,095 B1 | 9/2009 | Nordquist | |
| 11,138,786 B1 * | 10/2021 | Uhrenholt | G06T 1/20 |
| 2002/0073129 A1 | 6/2002 | Wang et al. | |
| 2003/0065809 A1 | 4/2003 | Byron | |
| 2006/0190943 A1 | 8/2006 | Haeri | |
| 2011/0302372 A1 | 12/2011 | Fontenot et al. | |
| 2012/0017062 A1 * | 1/2012 | Goel | G06F 15/8007 712/30 |
| 2013/0021360 A1 | 1/2013 | Gruber | |
| 2013/0226535 A1 | 8/2013 | Tuan | |

(Continued)

FOREIGN PATENT DOCUMENTS

GB        2597370    *    1/2022    ............. G06T 15/00

OTHER PUBLICATIONS

Non-Final Office Action in U.S. Appl. No. 17/489,105, dated Dec. 23, 2022, 19 pages.

(Continued)

*Primary Examiner* — Andrew G Yang
(74) *Attorney, Agent, or Firm* — Kowert, Hood, Munyon, Rankin & Goetzel, P.C.; Rory D. Rankin

(57) ABSTRACT

Systems, apparatuses, and methods for loading multiple primitives per thread in a graphics pipeline are disclosed. A system includes a graphics pipeline frontend with a geometry engine, shader processor input (SPI), and a plurality of compute units. The geometry engine generates primitives which are accumulated by the SPI into primitive groups. While accumulating primitives, the SPI tracks the number of vertices and primitives per group. The SPI determines wavefront boundaries based on mapping a single vertex to each thread of the wavefront while allowing more than one primitive per thread. The SPI launches wavefronts with one vertex per thread and potentially multiple primitives per thread. The compute units execute a vertex phase and a multi-cycle primitive phase for wavefronts with multiple primitives per thread.

17 Claims, 9 Drawing Sheets

(56) References Cited

U.S. PATENT DOCUMENTS

| | | |
|---|---|---|
| 2013/0332702 A1 | 12/2013 | Boudier |
| 2014/0362102 A1 | 12/2014 | Cerny et al. |
| 2015/0200867 A1 | 7/2015 | Dutta et al. |
| 2015/0208275 A1 | 7/2015 | Kakadia et al. |
| 2015/0212794 A1 | 7/2015 | Otenko |
| 2015/0235341 A1 | 8/2015 | Mei et al. |
| 2016/0055005 A1 | 2/2016 | Hsu et al. |
| 2016/0371082 A1 | 12/2016 | Yudanov et al. |
| 2017/0053374 A1 | 2/2017 | Howes et al. |
| 2018/0046474 A1 | 2/2018 | Wang et al. |
| 2018/0082399 A1* | 3/2018 | Martin ................. G06T 1/20 |
| 2018/0129499 A1* | 5/2018 | Østby .................. G06F 9/3887 |
| 2018/0165786 A1 | 6/2018 | Bourd et al. |
| 2018/0211435 A1* | 7/2018 | Nijasure ............... G06T 15/005 |
| 2018/0276046 A1 | 9/2018 | Joao et al. |
| 2019/0102224 A1 | 4/2019 | Bernat et al. |
| 2019/0108671 A1* | 4/2019 | Rollingson ........... G06T 15/005 |
| 2019/0236749 A1 | 8/2019 | Gould et al. |
| 2019/0258635 A1 | 8/2019 | Pal et al. |
| 2019/0370059 A1 | 12/2019 | Puthoor et al. |
| 2020/0193703 A1 | 6/2020 | Favela et al. |

OTHER PUBLICATIONS

Martin et al., U.S. Appl. No. 17/489,105, entitled "Graphics Primitives and Positions Through Memory Buffers", filed Sep. 29, 2021, 46 pages.

\* cited by examiner

LOAD MULTIPLE PRIMITIVES PER THREAD IN A GRAPHICS PIPELINE

BACKGROUND

Description of the Related Art

Three-dimensional (3-D) graphics are often processed using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, and patches are collectively referred to as primitives.

In a typical graphics pipeline, a sequence of work-items, which can also be referred to as threads, are processed so as to output a final result. Each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit.

Graphics processing pipelines include a number of stages that perform individual tasks, such as transforming vertex positions and attributes, calculating pixel colors, and so on. These tasks are performed in parallel by parallel execution units on the individual work items of wavefronts traversing the pipeline. Graphics processing pipelines are constantly being updated and improved.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for loading multiple primitives per thread in a graphics pipeline are disclosed herein. In one implementation, a system includes a graphics pipeline frontend with a geometry engine, shader processor input (SPI), and a plurality of compute units. The geometry engine generates primitives which are accumulated by the SPI into primitive groups. While accumulating primitives, the SPI tracks the number of vertices and primitives per group. The SPI determines wavefront boundaries based on mapping a single vertex to each thread of the wavefront while allowing more than one primitive per thread. The SPI launches wavefronts with one vertex per thread and potentially multiple primitives per thread. The compute units execute a vertex phase and a multi-cycle primitive phase for wavefronts with multiple primitives per thread.

Figure 1:
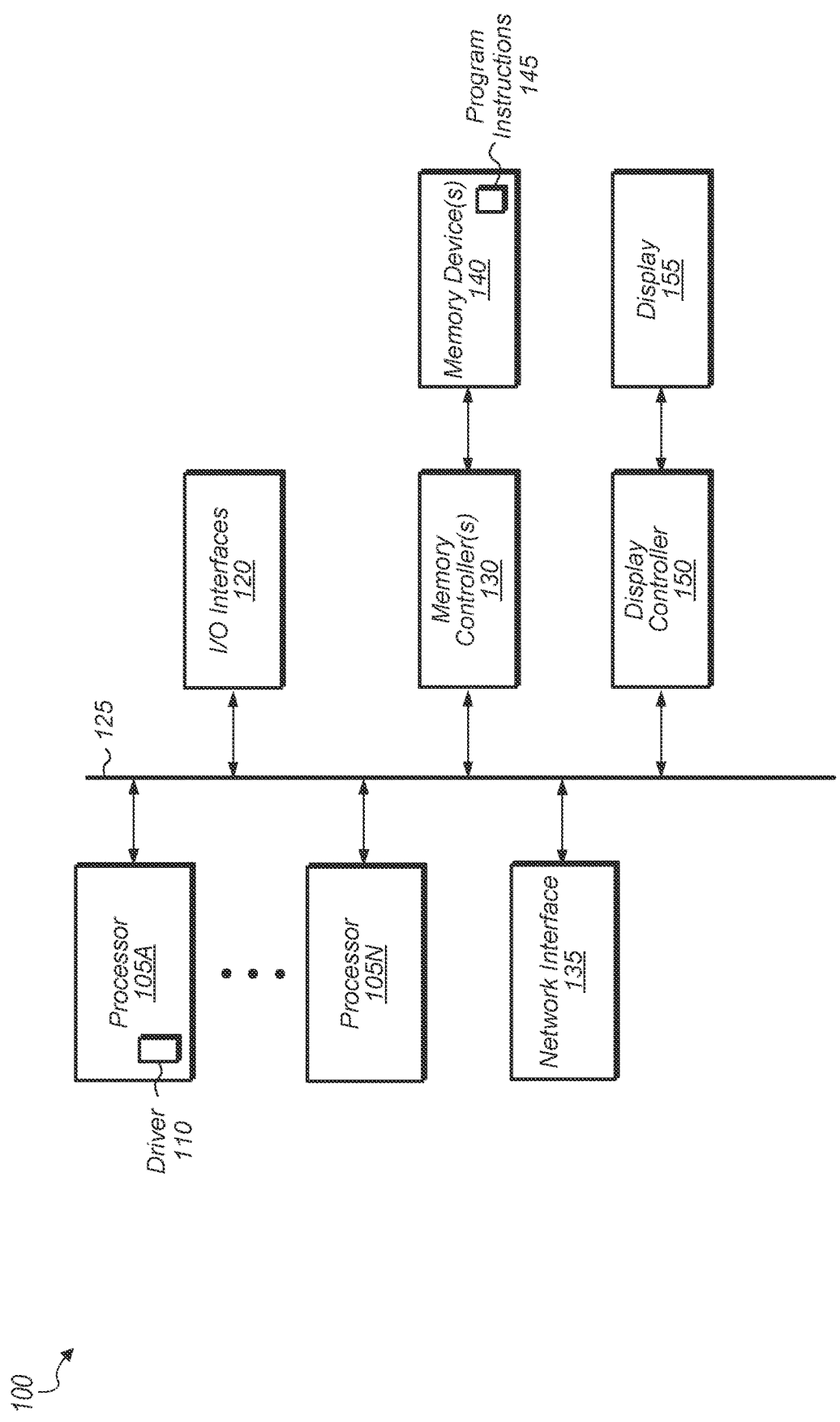
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a graphics processing unit (GPU) which processes data, executes parallel processing workloads, renders pixels for display controller 150 to drive to display 155, and/or executes other workloads.

GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

In some implementations, an application executing on processor 105A utilizes a graphics application programming interface (API) to invoke a user mode driver 110 (or a similar GPU driver). In one implementation, user mode driver 110 issues one or more commands to a GPU for rendering one or more graphics primitives into displayable graphics images. Based on the graphics instructions issued by the application to the user mode driver 110, the user mode driver 110 formulates one or more graphics commands that specify one or more operations for the GPU to perform for rendering graphics. In some implementations, the user mode driver 110 is a part of an application running on a CPU. For example, the user mode driver 110 may be part of a gaming application running on the CPU. In one implementation, when driver 110 is a kernel mode driver, driver 110 is part of an operating system (OS) running on the CPU.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
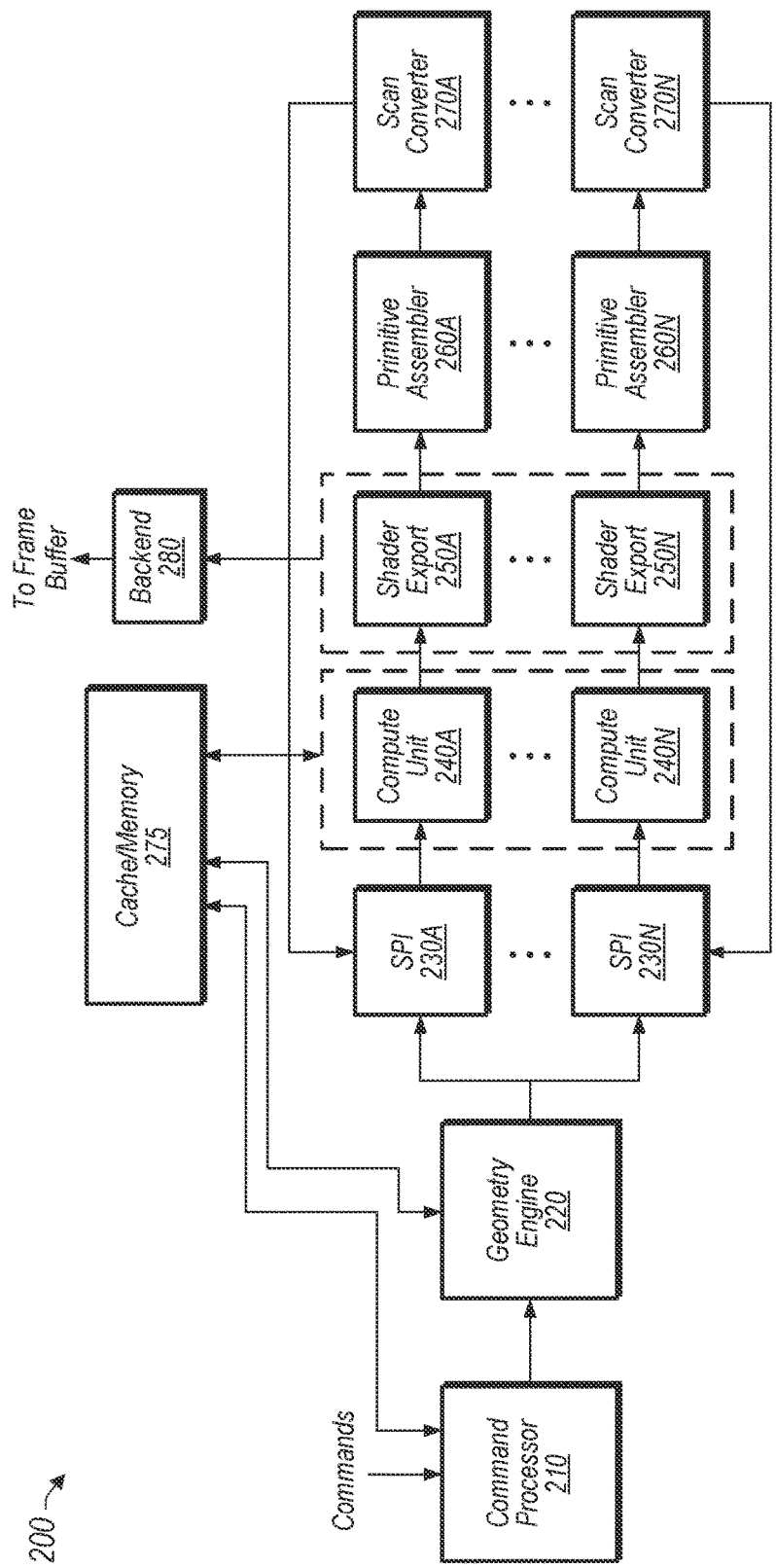
FIG. 2 is a block diagram of one implementation of a GPU.

Turning now to FIG. 2, a block diagram of one implementation of a GPU 200 is shown. In one implementation, command processor 210 processes commands received from a host processor (e.g., processor 105A of FIG. 1). Also, command processor 210 sets GPU 200 in the correct state to execute the received commands. In one implementation, the received commands are intended to cause GPU 200 to render various scenes of a video game application, movie, or other application. Based on commands received from command processor 210, geometry engine 220 processes indices according to the topology (e.g., points, lines, triangles) and connectivity of the scene being rendered. For example, in one implementation, geometry engine 220 processes a mesh based on quadrilateral primitives or triangle primitives that represent a three-dimensional (3D) object. In this example, geometry engine 220 reads vertices out of a buffer (stored in cache/memory 275) using fixed function operations, forming mesh geometry, and creating pipeline work items. Each mesh processed by geometry engine 220 can have a different ratio of primitives to vertices depending on the density/complexity of the mesh, vertex reuse, and so on.

Geometry engine 220 is coupled to any number of shader processor inputs (SPIs) 230A-N, with the number varying according to the implementation. SPIs 230A-N accumulate work items until enough work items have been received to generate a wavefront, and then SPIs 230A-N launch the wavefronts on compute units 240A-N, respectively. Depending on the implementation, a wavefront can include 32 work items, 64 work items, or some other number of work items. It is noted that the terms "work item" and "thread" can be used interchangeably herein. In one implementation, SPIs 230A-N launch wavefronts with one vertex per thread and with up to two primitives per thread. The exact values of primitives per thread varies according to the specific geometry being processed, and the numbers of primitives per thread can vary from wavefront to wavefront. In other implementations, the wavefronts launched by SPIs 230A-N have other numbers of vertices per thread, other numbers of primitives per thread, and/or other vertex-to-primitive ratios.

Compute units 240A-N execute shader programs to process the wavefronts received from SPIs 230A-N. In one implementation, a geometry front-end includes a vertex shader and a hull shader that operate on high order primitives such as patches that represent a three-dimensional (3D) model of a scene. In this implementation, the geometry front-end provides the high order primitives to a shader which generates lower order primitives from the higher order primitives. The lower order primitives are then replicated, shaded, and/or sub-divided before being processed by pixel shaders. The pixel shaders perform culling, rasterization, depth testing, color blending, and the like on the primitives to generate fragments or pixels for display. In other implementations, other types and/or sequences of shaders are employed to process the various wavefronts traversing the pipeline.

Compute units 240A-N read from and write to cache/memory 275 during execution of the shader programs. Shader export units 250A-N manage the outputs from the compute units 240A-N and forward the outputs either to the primitive assemblers 260A-N or the backend 280. For example, in one implementation, shader export units 250A-N export the positions of vertices after transformation. Primitive assemblers 260A-N accumulate and connect vertices that span primitives and pass the primitives to scan converters 270A-N which perform rasterization. Scan converters 270A-N determine which pixels are covered by the primitives and forward the pixel data to SPIs 230A-N which will then launch pixel shader wavefronts on compute units 240A-N.

Figure 3:
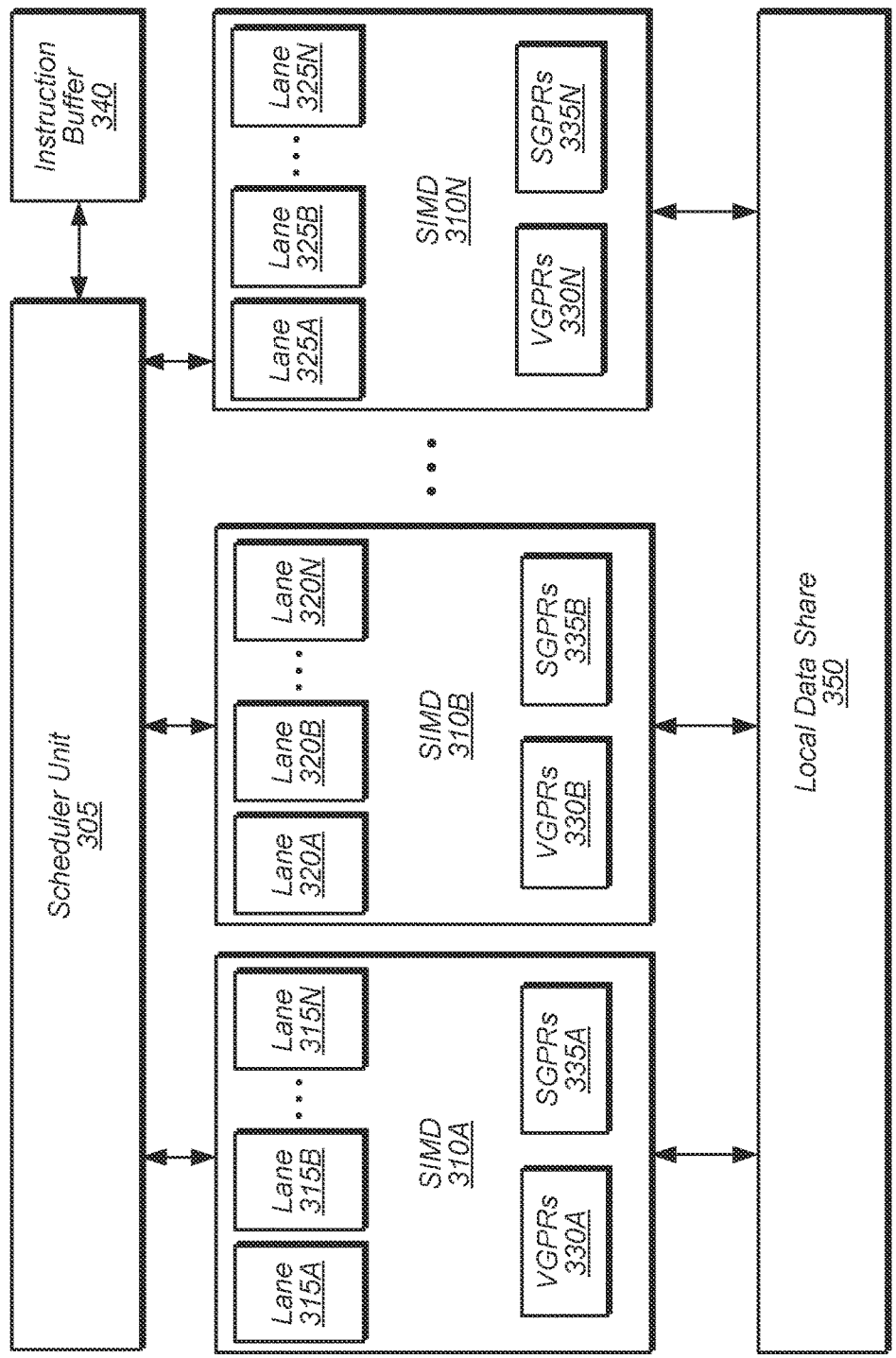
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, scheduler unit 305, instruction buffer 340, and local data share (LDS) 350. It is noted that compute unit 300 can also include other components which are not shown in FIG. 3 to avoid obscuring the figure. In one implementation, compute units 240A-N (of FIG. 2) include the components of compute unit 300.

In one implementation, compute unit 300 executes instructions of a kernel on any number of wavefronts. These instructions are stored in instruction buffer 340 and scheduled for execution on SIMDs 310A-N by scheduler unit 305. In one implementation, the width of a wavefront matches a number of lanes in lanes 315A-N, 320A-N, and 325A-N in SIMDs 310A-N. Each lane 315A-N, 320A-N, and 325A-N of SIMDs 310A-N can also be referred to as an "execution unit".

In one implementation, GPU 300 receives a plurality of instructions for a wavefront with a number of work-items. When work-items execute on SIMDs 310A-N, each work-item is assigned a corresponding portion of vector general purpose registers (VGPRs) 330A-N, scalar general purpose registers (SGPRs) 335A-N, and LDS 350. It is noted that the letter "N" when displayed herein next to various structures is meant to generically indicate any number of elements for that structure (e.g., any number of SIMDs 310A-N). Additionally, different references within FIG. 3 that use the letter "N" (e.g., SIMDs 310A-N and lanes 315A-N) are not intended to indicate that equal numbers of the different elements are provided (e.g., the number of SIMDs 310A-N can differ from the number of lanes 315A-N).

Figure 4:
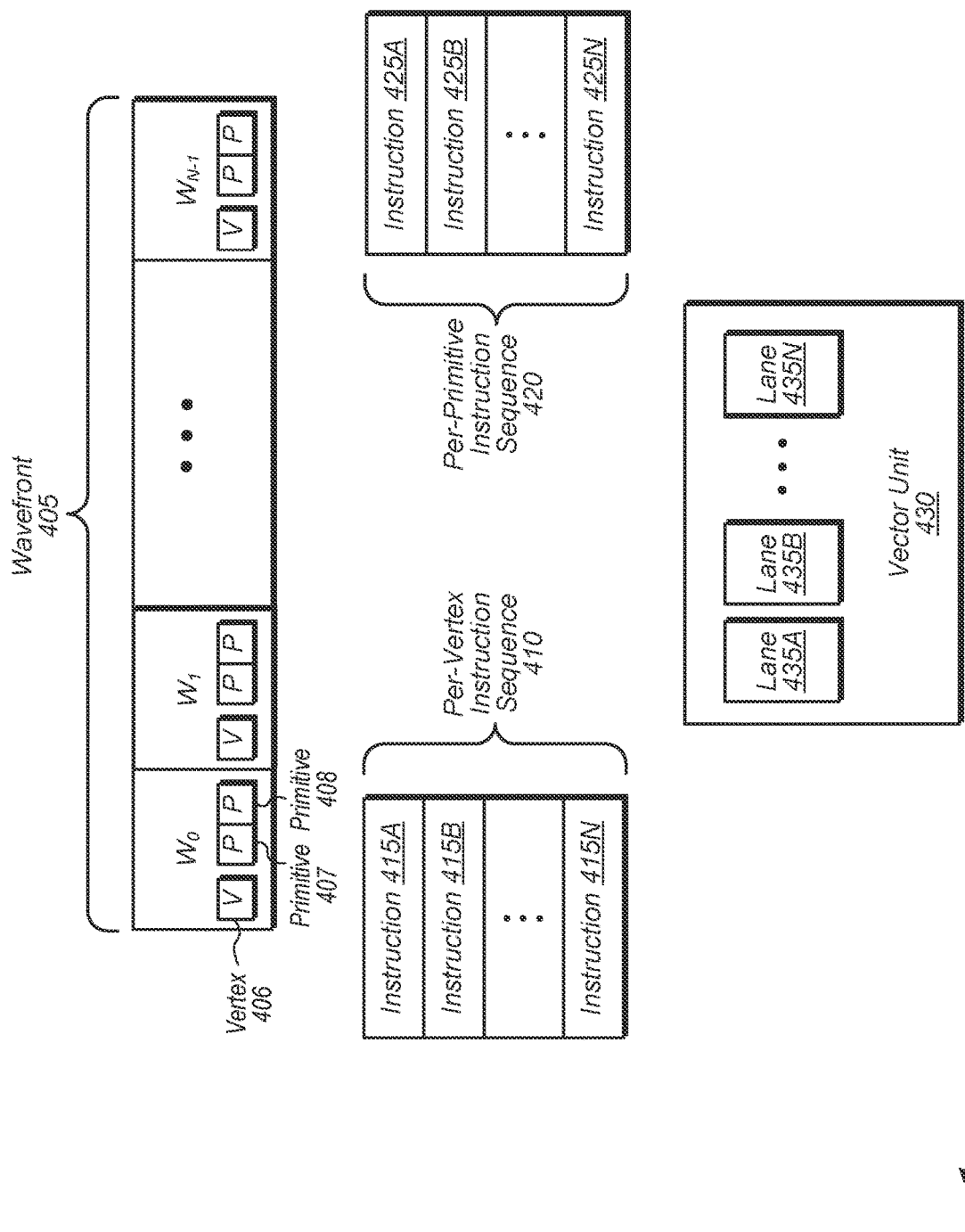
FIG. 4 illustrates one implementation of an example wavefront and example instruction sequences.

Turning now to FIG. 4, one implementation of an example wavefront 405 and example instruction sequences 410 and 420 are shown. Wavefront 405 is intended to illustrate one example of a wavefront in accordance with one implementation. Wavefront 405 includes N number of work-items, wherein "N" is a positive integer, and wherein "N" is the number of lanes 435A-N in vector unit 430. Vector unit 430 can also be referred to as a SIMD unit or a parallel processor. In one implementation, N is 32 and the number of work-items per wavefront is 32 and the number of lanes in vector unit 430 is 32. As shown, each work item is associated with one vertex and two primitives, with vertex 406 and primitives 407 and 408 labeled for the first work item, $W_0$. Primitives 407 and 408 are representative of per-primitive data (e.g., connectivity data) that is loaded by the first work item $W_0$ for two separate primitives. It should be understood that this example is merely representative of one particular wavefront vertex-primitive ratio. Other wavefronts can have other numbers of primitives per vertex. Also, it is possible for some work items to have different vertex-primitive ratios than other work items within the same wavefront.

Per-vertex instruction sequence 410 is illustrative of one example of an instruction sequence to be executed for each vertex of wavefront 405 on vector unit 430. As shown in FIG. 4, per-vertex instruction sequence 410 includes instructions 415A-N, which are representative of any number and type of instructions of a shader program. For example, instructions 415A-N can cause lanes 435A-N to perform operations which include, but are not limited to, transformations, skinning, morphing, per-vertex lighting, modeling transformations, viewing transformations, projection transformations, perspective division, viewport transformations, attribute modifications, and others.

Per-primitive instruction sequence 420 is illustrative of one example of an instruction sequence to be executed for each primitive of wavefront 405 on vector unit 430. Per-primitive instruction sequence 420 includes instructions 425A-N, which are representative of any number and type of instructions of a shader program. For example, instructions 425A-N can cause lanes 435A-N to perform operations which include, but are not limited to, point sprite expansion, dynamic particle system operations, fur-fin generation, shadow volume generation, single pass render-to-cubemap, per-primitive material swapping, per-primitive material setup, and others. In one implementation, per-vertex instruction sequence 410 and per-primitive instruction sequence 420 are stored in an instruction buffer (e.g., instruction buffer 340 of FIG. 3) which is accessible by vector unit 430.

Figure 5:
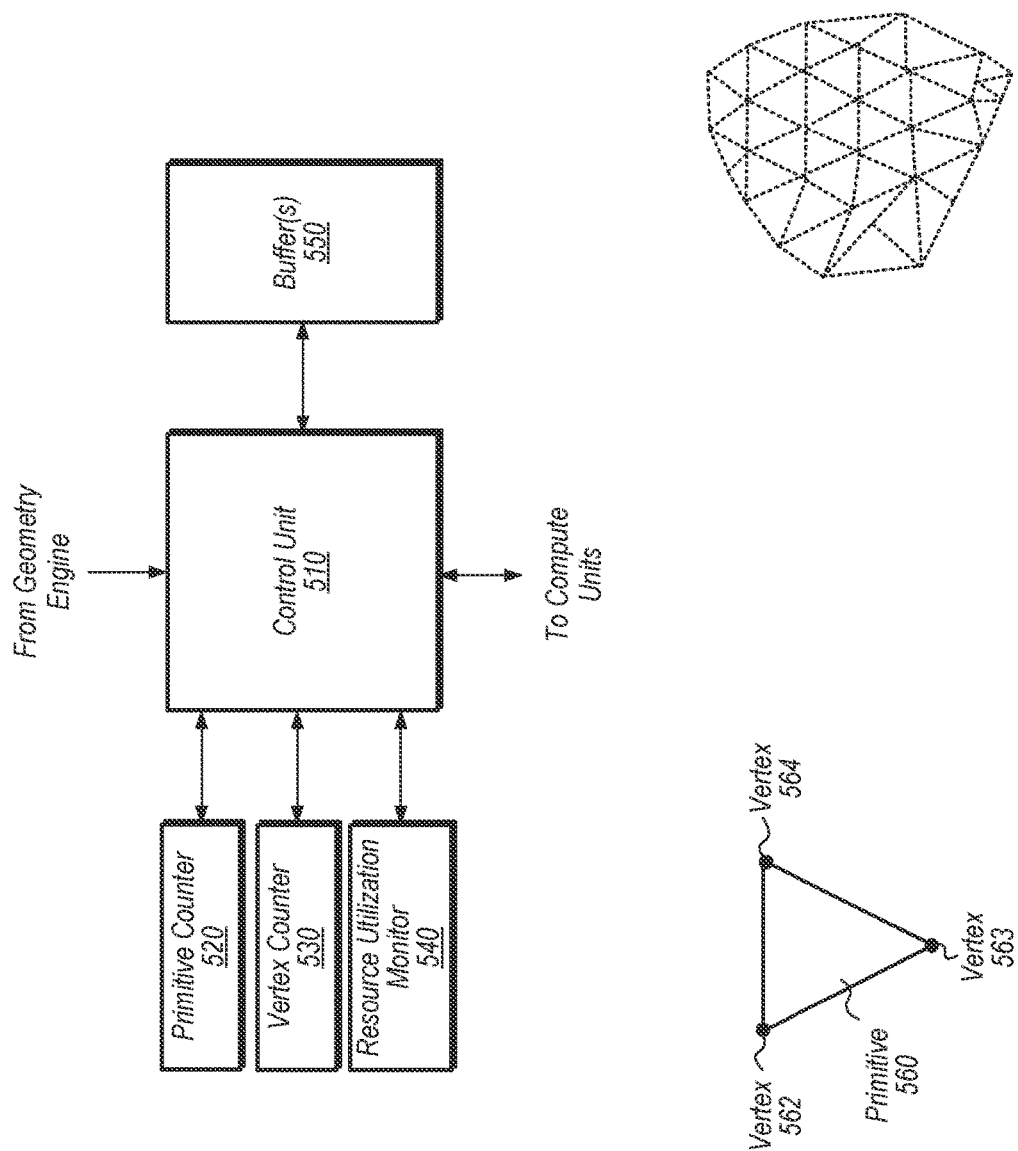
FIG. 5 is a block diagram of one implementation of a shader processor input (SPI).

Turning now to FIG. 5, a block diagram of one implementation of a shader processor input (SPI) 500 is shown. In one implementation, the components of SPI 500 are included in SPIs 230A-N (of FIG. 2). SPI 500 receives primitives and vertices from a geometry engine (e.g., geometry engine 220) and stores pointers to the corresponding indices and data in buffer(s) 550. Buffer(s) 550 are representative of any type and number of buffers, queues, and/or other storage elements. When SPI 500 accumulates enough references to primitives and/or vertices in buffer(s) 550, SPI 500 generates corresponding wavefronts and conveys the wavefronts to compute units (e.g., compute units 240A-N) to be executed.

In one implementation, control unit 510 tracks the number of primitives and vertices that have been accumulated using primitive counter 520 and vertex counter 530, respectively. In one implementation, control unit 510 uses the number of accumulated vertices to determine when to submit wavefronts to the compute units for execution. For example, if the wavefront size is 32 threads, then control unit 510 sends wavefronts to the compute units with numbers of threads that are multiples of 32. Control unit 510 also allows the number of primitives per thread to exceed one primitive per thread. In one implementation, control unit 510 allows up to two primitives per thread for wavefronts sent to the compute units. In this implementation, the compute units will perform multiple cycles to process primitives in any given wavefront when the given wavefront has more than one primitive per thread.

In one implementation, control unit 510 monitors resource utilization of the compute units using resource utilization monitor 540. In this implementation, control unit 510 controls the mix of vertices and primitives per thread based on the current resource utilization of the compute units. Resources that are monitored include, but are not limited to, vector and scalar registers, wavefront slots, and local data share (LDS) space. Control unit 510 attempts to maintain a desired level of performance and/or throughput by generating wavefront boundaries that will more efficiently utilize the resources available in the compute units.

At the bottom of FIG. 5, a primitive 560 and mesh 570 made up of multiple primitives are shown. Primitive 560 includes three vertices 562, 563, and 564, which would result in a primitive count of 1 and a vertex count of 3 for primitive counter 520 and vertex counter 530, respectively. However, mesh 570 includes multiple primitives (i.e., triangles) connected together, which results in considerable vertex reuse among the primitives. This results in a primitive-to-vertex ratio of much less than the 3:1 ratio of primitive 560. It should be understood that the primitive-to-vertex ratio can vary widely depending on the type of primitives and meshes being processed. Using the techniques presented within this disclosure, control unit 510 (and the other SPI components and graphics pipeline components shown in the other figures) are able to adapt to these varying ratios and still maintain a high level of performance and throughput.

Figure 6:
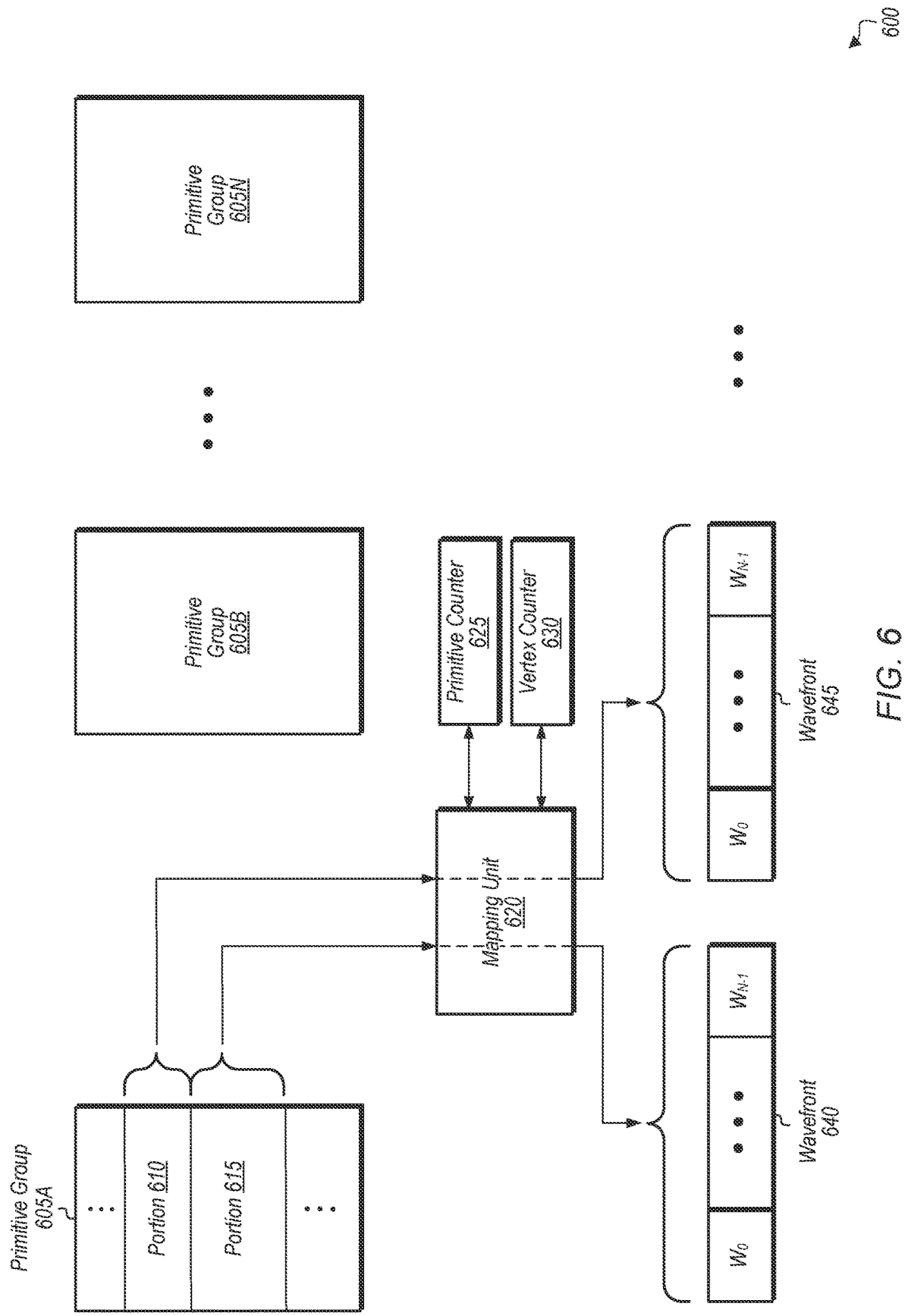
FIG. 6 is a block diagram of one implementation of a mapping unit of a SPI.

Turning now to FIG. 6, a block diagram of one implementation of a mapping unit 600 of a SPI is shown. In one implementation, mapping unit 600 is part of a control unit (e.g., control unit 510 of FIG. 5) of a SPI (e.g., SPI 500). In one implementation, mapping unit 600 maps portions of primitive groups to wavefronts which are then launched on one or more compute units (e.g., compute units 240A-N of FIG. 2). In one implementation, primitives assembled by a geometry engine (e.g., geometry engine 220) are accumulated into primitive groups 605A-N. In one implementation, each primitive group 605A-N has a fixed number of primitives (e.g., 128 primitives). In this implementation, while the number of primitives per group is fixed, the number of vertices can vary from group to group. In another implementation, primitive groups 605A-N can have different numbers of primitives.

As shown in FIG. 6, mapping unit 620 maps portion 610 of primitive group 605A to wavefront 640 and portion 615 of primitive group 605A to wavefront 645. These wavefronts 640 and 645 can then be launched on corresponding compute units. The remainder of primitive group 605A and primitive groups 605B-N can also be mapped to other wavefronts by mapping unit 620 and then launched on compute units. In one implementation, mapping unit 620 tracks the numbers of primitives and vertices per portions 610 and 615 using primitive counter(s) 625 and vertex counter(s) 630. Primitive counter(s) 625 and vertex counter(s) 630 are representative of any number of counters. In one implementation, mapping unit 620 attempts to assign a single vertex to each work item of wavefronts 640 and 645. In this implementation, mapping unit 620 allows up to two primitives to be assigned to each work item of wavefronts 640 and 645. For example, in one implementation, if wavefronts 640 and 645 have 32 work items, then mapping unit 620 partitions primitive group 605A into portions 610 and 615 based on portions 610 and 615 having 32 vertices. The number of primitives that corresponds to 32 vertices can vary from portion to portion depending on the primitive type, type of mesh or patch being processed, prevalence of vertex overlap, and so on.

While FIG. 6 illustrates portions of primitive groups being mapped to wavefronts, it should be understood that this is merely indicative of one particular implementation. In other implementations, it is possible for multiple primitive groups to be mapped to a single wavefront. This is dependent on how many primitives are in a group, how many work items are in a wavefront, how many vertices are allowed to be assigned to each work item, how many primitives are allowed to be assigned to each work item, and so on. These variables can be adjusted in other implementations for other SIMD widths, shader export unit capabilities, and other architectural details.

Figure 7:
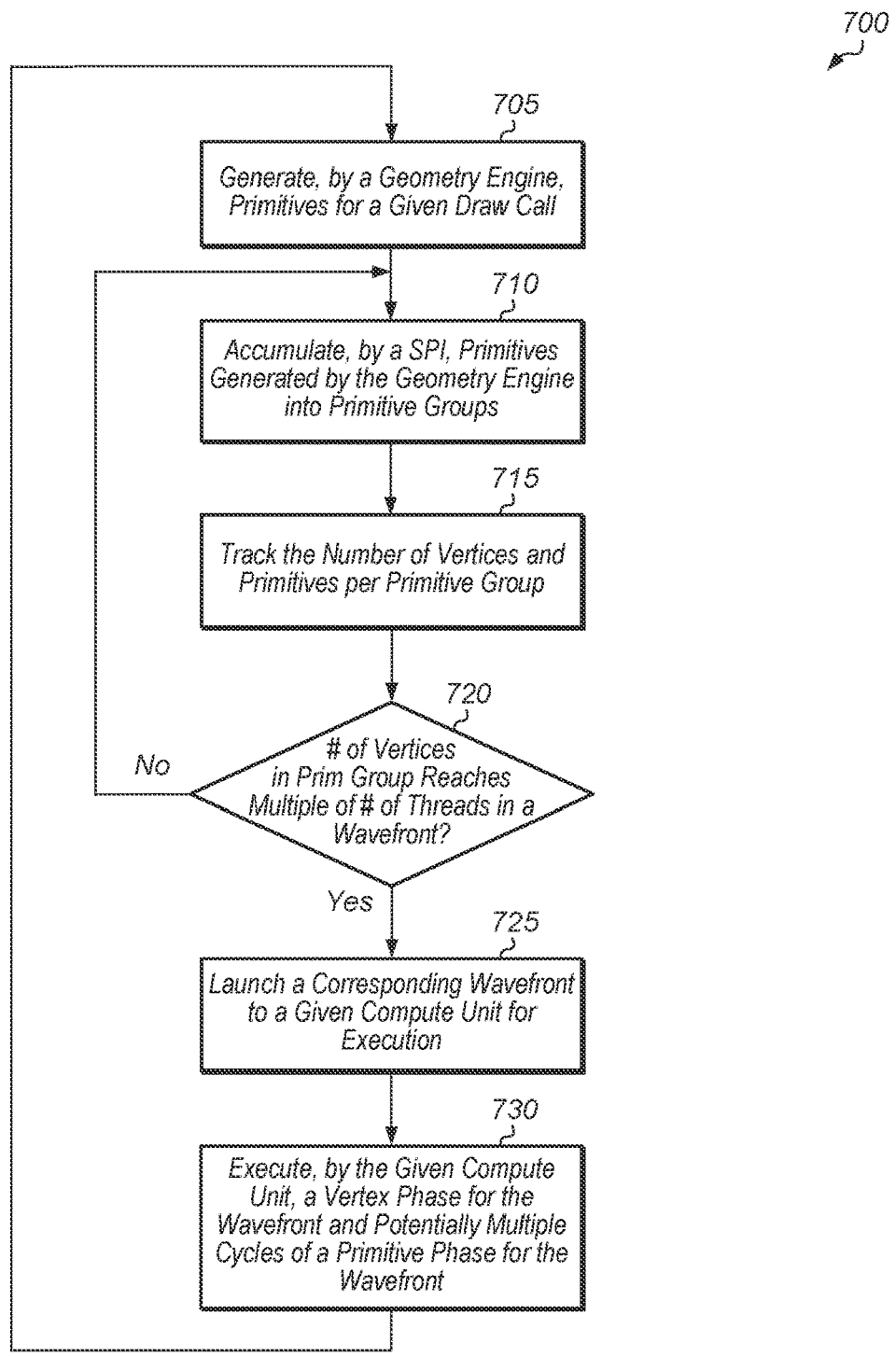
FIG. 7 is a generalized flow diagram illustrating one implementation of a method for loading multiple primitives per thread.
Figure 8:
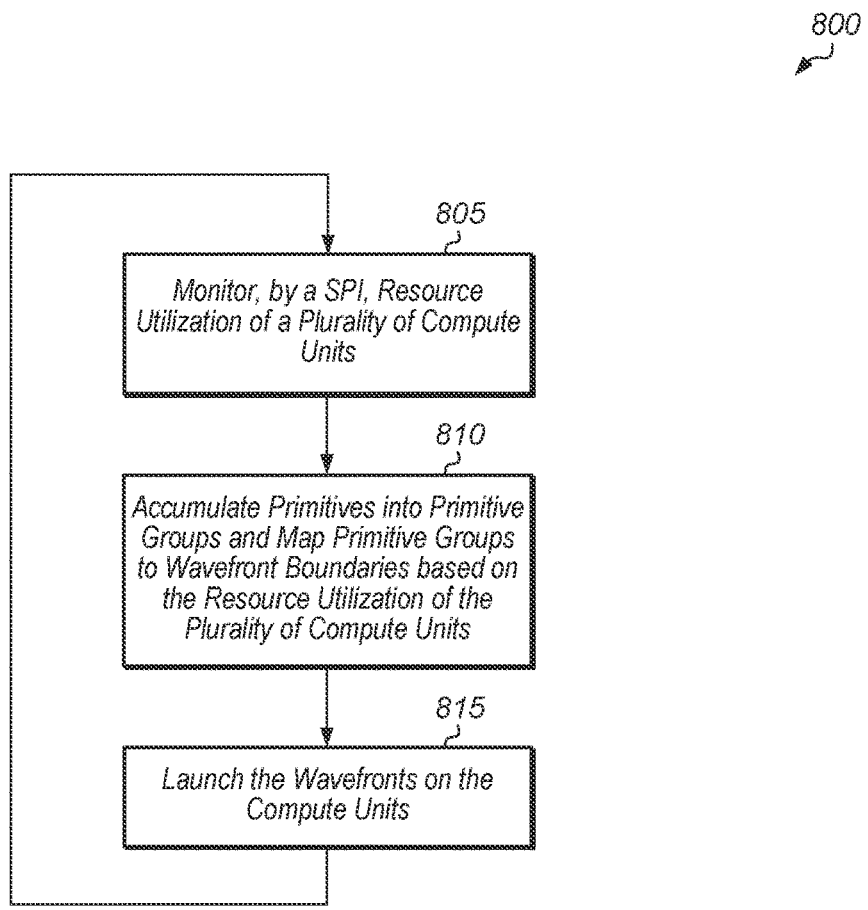
FIG. 8 is a generalized flow diagram illustrating one implementation of a method for determining wavefront boundaries based on resource utilization.
Figure 9:
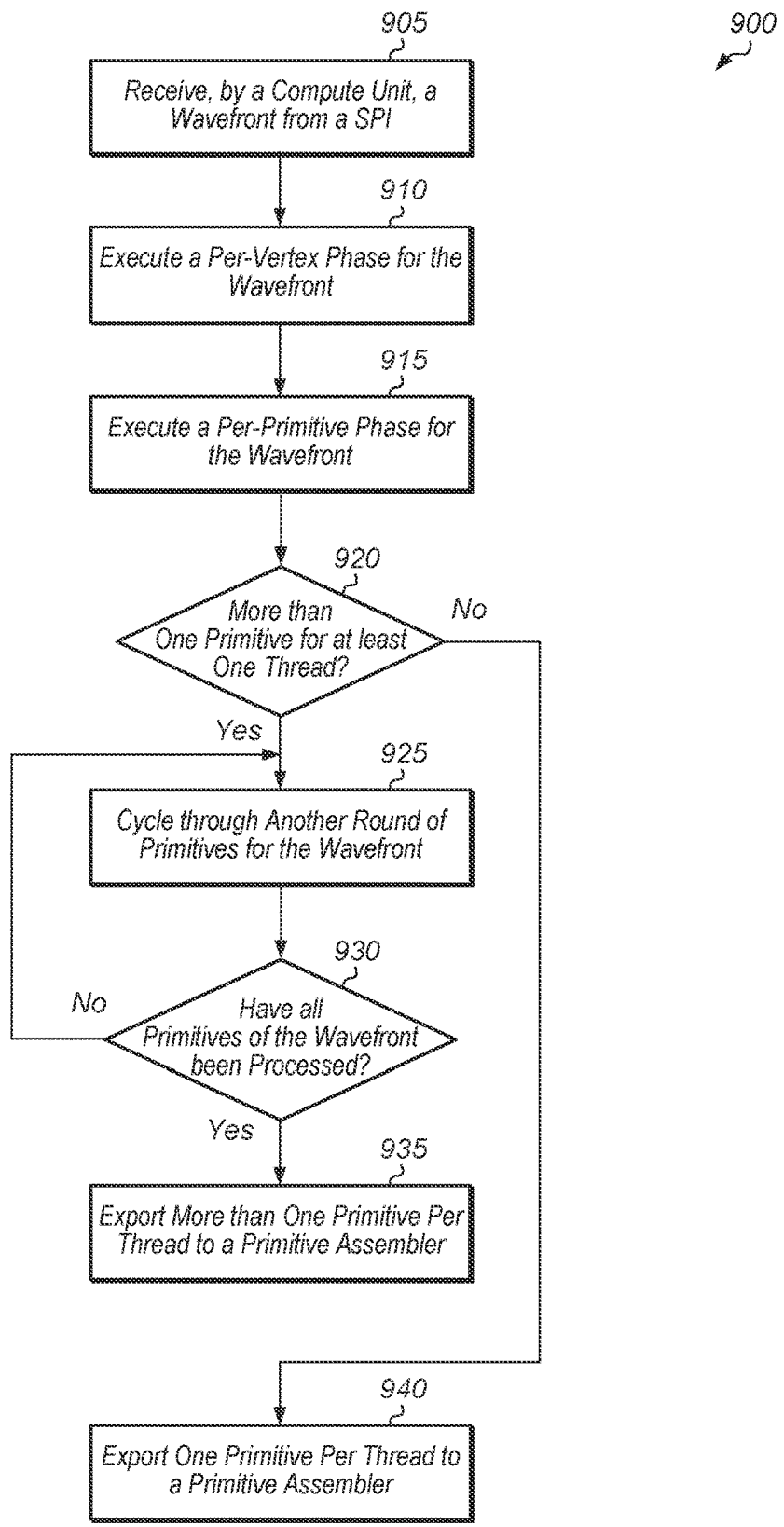
FIG. 9 is a generalized flow diagram illustrating one implementation of a method for performing, by a compute unit, a multi-cycle primitive phase for a given wavefront.

Referring now to FIG. 7, one implementation of a method 700 for loading multiple primitives per thread is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700 (and methods 800-900).

A geometry engine generates primitives for a given draw call (block 705). A shader processor input (SPI) accumulates primitives generated by the geometry engine into primitive groups (block 710). While accumulating primitives, the SPI tracks the number of vertices and primitives per primitive group (block 715). When the number of vertices in a given primitive group reaches a multiple of the number of threads in a wavefront (conditional block 720, "yes" leg), the SPI launches a corresponding wavefront to a given compute unit for execution (block 725). It is noted that the wavefront launched to the given compute unit can have more than one primitive per thread. Next, the given compute unit executes a vertex phase for the wavefront and potentially multiple cycles of a primitive phase for the wavefront (block 730). After block 730, method 700 returns to block 705.

Turning now to FIG. 8, one implementation of a method 800 for determining wavefront boundaries based on resource utilization is shown. A shader processor input (SPI) monitors resource utilization of a plurality of compute units (block 805). The resources which are monitored include, but are not limited to, occupancy/availability of vector and scalar registers, wavefront slots, and local data share (LDS) space. The SPI accumulates primitives into primitive groups and maps primitive groups to wavefront boundaries based on the resource utilization of the plurality of compute units (block 810). For example, if the number of available VGPRs is less than a threshold, then the SPI maps fewer primitives to each wavefront. Other techniques for adjusting primitive group boundaries based on resource utilization are possible and are contemplated. Next, the SPI launches the wavefronts on the compute units (block 815). After block 815, method 800 returns to block 805.

Referring now to FIG. 9, one implementation of a method 900 for a compute unit to perform a multi-cycle primitive phase for a given wavefront is shown. A compute unit (e.g., compute unit 240A of FIG. 2) receives a wavefront from a SPI (e.g., SPI 230A) (block 905). It is noted that the wavefront received from the SPI may have multiple primitives per thread. The compute unit executes a per-vertex phase for the wavefront (block 910). Next, the compute unit executes a per-primitive phase for the wavefront (block 915). If there is more than one primitive for at least one thread of the wavefront (conditional block 920, "yes" leg), then the compute unit cycles through another round of primitives for the wavefront (block 925). It is noted that some threads might only have one primitive, but if at least one thread has multiple primitives, then method 900 will go to block 925. It is also noted that an execution mask can be used to cause instructions to be executed only for those threads which are active based on having primitives for a subsequent round. The execution mask also controls which threads are to be switched off based on not having primitives for the subsequent round.

If there are more primitives to process per thread (conditional block 930, "yes" leg), then method 900 returns to block 925. Otherwise, if all of the primitives have been processed for the wavefront (conditional block 930, "no" leg), then a shader export unit (e.g., shader export unit 250A) exports more than one primitive per thread to a primitive assembler (e.g., primitive assembler 260A) (block 935), and then method 900 ends. If there is only one primitive per thread (conditional block 920, "no" leg), then the shader export unit exports one primitive per thread to the primitive assembler (block 940). After block 940, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a plurality of compute units; and
a shader processor input (SPI) comprising circuitry configured to:
accumulate primitives into primitive groups while tracking numbers of vertices and primitives in the primitive groups;
map primitive groups to wavefront boundaries based on the numbers of vertices and primitives in the primitive groups; and
convey a first wavefront that includes one vertex per thread and one primitive per thread; and
convey a second wavefront that includes one vertex per thread and two primitives per thread;
wherein the plurality of compute units comprise circuitry configured to execute wavefronts, received from the SPI, to render pixels for display.

2. The apparatus as recited in claim 1, wherein the SPI is further configured to convey wavefronts with one vertex per thread and at least one thread with more than one primitive to the plurality of compute units when a primitive-to-vertex ratio is greater than one.

3. The apparatus as recited in claim 1, wherein the plurality of compute units are configured to execute multiple per-primitive phase cycles for wavefronts that include more than one primitive per thread.

4. The apparatus as recited in claim 1, wherein the SPI is further configured to determine boundaries of wavefronts based on a one-to-one mapping of vertices to threads and up to two primitives per thread.

5. The apparatus as recited in claim 1, wherein the SPI is further configured to populate wavefronts with twice as many primitives as vertices.

6. The apparatus as recited in claim 1, wherein the SPI is further configured to:
monitor resource utilization of the plurality of compute units; and
adjust a ratio of vertices to primitives per thread based on the resource utilization.

7. A method comprising:
accumulating, by circuitry of a shader processor input (SPI), primitives into primitive groups while tracking numbers of vertices and primitives in the primitive groups;
mapping primitive groups to wavefront boundaries based on the numbers of vertices and primitives in the primitive groups;
conveying a first wavefront that includes one vertex per thread and one primitive per thread;
conveying a second wavefront that includes one vertex per thread and two primitives per thread; and
executing, by one or more compute units, wavefronts received from the SPI, to render pixels for display.

8. The method as recited in claim 7, further comprising conveying wavefronts with one vertex per thread and at least one thread with more than one primitive to the one or more compute units when a primitive-to-vertex ratio is greater than one.

9. The method as recited in claim 7, further comprising executing, by the one or more compute units, multiple per-primitive phase cycles for wavefronts that include more than one primitive per thread.

10. The method as recited in claim 7, further comprising determining boundaries of wavefronts based on a one-to-one mapping of vertices to threads and up to two primitives per thread.

11. The method as recited in claim 7, further comprising populating wavefronts with twice as many primitives as vertices.

12. The method as recited in claim 7, further comprising:
monitoring resource utilization of the one or more compute units; and
adjusting a ratio of vertices to primitives per thread based on the resource utilization.

13. A system comprising:
a memory; and
a processor comprising circuitry configured to:
assemble primitives from data stored in the memory;
accumulate primitives into primitive groups while tracking numbers of vertices and primitives in the primitive groups;
map primitive groups to wavefront boundaries based on the numbers of vertices and primitives in the primitive groups;
execute a first wavefront that includes one vertex per thread and one primitive per thread;
execute a second wavefront that includes one vertex per thread and two primitives per thread; and
execute the wavefronts to generate pixel data to be displayed.

14. The system as recited in claim 13, wherein the processor is further configured to execute wavefronts with one vertex per thread and at least one thread with more than one primitive when a primitive-to-vertex ratio is greater than one.

15. The system as recited in claim 13, wherein the processor is further configured to execute multiple per-primitive phase cycles for wavefronts that include more than one primitive per thread.

16. The system as recited in claim 13, wherein the processor is further configured to determine boundaries of wavefronts based on a one-to-one mapping of vertices to threads and up to two primitives per thread.

17. The system as recited in claim 13, wherein the processor is further configured to populate wavefronts with twice as many primitives as vertices.

* * * * *